United States Patent [19]

Bale et al.

[11] Patent Number: 5,150,332
[45] Date of Patent: Sep. 22, 1992

[54] METHOD OF ASSIGNING A SEISMIC TRACE

[75] Inventors: Richard Bale, Beckenham; Richard Hale, Orpington, all of England

[73] Assignee: GECO A.S., Stavanger, Norway

[21] Appl. No.: 746,640

[22] Filed: Aug. 19, 1991

[30] Foreign Application Priority Data

Aug. 21, 1990 [GB] United Kingdom ............... 9018317

[51] Int. Cl.$^5$ .............................................. G01V 1/00
[52] U.S. Cl. .................................................... 367/73
[58] Field of Search ....................... 367/21, 73, 56, 38

[56] References Cited
FOREIGN PATENT DOCUMENTS

0366224A3  6/1989  European Pat. Off. .
0367349A3  10/1989  European Pat. Off. .
2217014A  10/1989  United Kingdom .

*Primary Examiner*—Ian J. Lobo
*Attorney, Agent, or Firm*—Fleit, Jacobson, Cohn, Price, Holman & Stern

[57] ABSTRACT

A method of assigning seismic traces obtained by means of one or more seismic sources (1) and receivers (2) wherein, a plane containing each source (1) and receivers (2) is divided into a regular array of regions (12–18), for example a rectangular array referred to cartesian coordinates (X-Y). The regions cover at least a middle portion of a line (11) joining each source (1) to each receiver (2). Diagonals (19–25) intersect the line (11) at respective intersection points and offspring traces are allocated to these points.

13 Claims, 2 Drawing Sheets

METHOD OF ASSIGNING A SEISMIC TRACE

BACKGROUND OF THE INVENTION

The present invention relates to a method of assigning a seismic trace, for instance in dip-moveout correction, normally referred to as "DMO".

In seismic exploration, acoustic signals produced by a seismic source travel downwardly into the earth and are reflected back to a number of seismic receivers, such as geophones for use on land or hydrophones for seismic exploration below the sea. The digitally recorded signals received by the receivers are normally referred to as traces and are processed in order to yield information about the nature of the earth below the area being investigated. For instance, these signals carry information indicating the structure of reflective layers such as boundaries between different types of rocks.

The procedure of converting recorded traces into a subsurface image is typically divided into several steps, each producing an intermediate result which may be useful. Ideally all the reflected signals are transformed (or "migrated") to their actual subsurface location, and are there combined, by summation, with all data corresponding to the same location. This procedure may in principle be performed in a single step, referred to as "prestack migration" by those skilled in the art. However, in order to facilitate parameter selection and reduce computational requirements, this procedure is usually subdivided into four steps.

Firstly, two corrections are made to eliminate the effects of source-receiver separation (or offset): one a velocity dependent correction known as normal moveout (NMO), which assumes reflections occur at horizontal interfaces; the other a velocity independent correction known as dip moveout (DMO), which compensates for the mispositioning due to any inclination (or dip) of the reflecting interfaces. The theory of dip moveout is generally based on constant velocity, but it is sufficiently accurate for most cases where velocity varies. Application of NMO and DMO produces traces which simulate the recording of a survey with the source and receiver at the same location (zero offset traces), and permits the summation (or stacking) of traces with the same or similar locations, to produce the "stack". As well as reducing the number of traces for subsequent processing this step improves the signal-to-noise ratio of the data. Finally, reflectors are moved to their correct positions by a zero offset migration of the stack.

In the case of 3D seismic data, in which the survey has been conducted with the sources and receivers arranged to cover an area of the surface and so obtain data from a 3-dimensional portion of the earth, the traces are collected into geometric cells (or bins) which make up a regular grid, either at the surface or at some reference plane defined for processing purposes. The stack is obtained by summing traces which fall within the same cell, to generate a single trace for each grid location. The location of such traces is partly determined by the arrangement of sources and receivers, but may also be affected by the location of traces generated by the dip moveout step, prior to stacking.

BRIEF SUMMARY OF THE INVENTION

According to the invention, there is provided a method of assigning a parent seismic trace obtained by means of a seismic energy source at a first location and a receiver at a second location, comprising defining a two-dimensional co-ordinate system representing a plane containing the first and second locations; dividing the plane into a regular array of congruent regions covering at least a portion of a straight line segment extending between the first and second locations; defining, in each region intersected by the portion of the straight line segment, a crossing line which intersects the straight line segment at an intersection point, the crossing lines being parallel to each other and the intersection points being evenly spaced apart; and assigning offspring seismic traces to the intersection points.

Preferably, each crossing line passes through the center of area of each region. Preferably, the two-dimensional co-ordinate system is a rectangular Cartesian co-ordinate system, the regions are rectangles, and the crossing lines are diagonals of the rectangles, the polarity of the slopes of the diagonals with respect to the co-ordinate system being opposite that of the line segment.

Preferably, the plane is horizontal. In most situations the or each source and the or each receiver can be assumed to lie in a horizontal plane, despite variations in height caused, for instance, by the surface topography of the ground. Errors introduced by this assumption can if necessary be eliminated or reduced, for instance by "static" corrections to the horizontal plane.

Preferably, the method is performed with a plurality of sources and a plurality of receivers in order to obtain three-dimensional information about the region of the earth below an area of interest. In this case, the sources may be actuated in turn with a delay between consecutive sources sufficiently long for all the reflected energy of interest to have arrived at all of the receivers. The method is then repeated for each combination of the sources and receivers using the same co-ordinate system and the same division into regions.

The method may be used in DMO, the offspring traces assigned to intersection points for each region then being added together or "stacked".

BRIEF DESCRIPTION OF THE DRAWINGS

The invention will be further described, by way of example, with reference to the accompanying drawings, in wherein.

DETAILED DESCRIPTION

Figure 1:
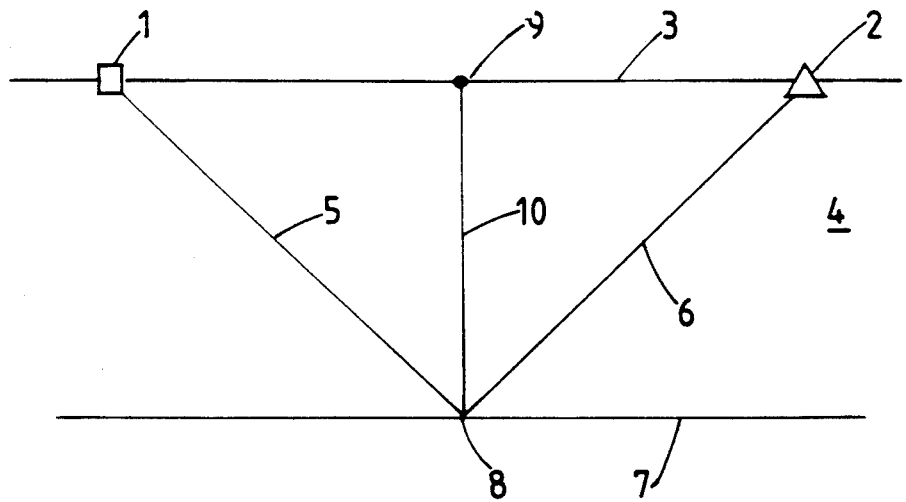
FIG. 1 is a diagram illustrating normal-moveout correction.

In the drawings, sources 1 are represented by small squares and receivers 2 are represented by small triangles.

In FIG. 1, a seismic energy source 1, for instance of the impulsive type, and a receiver 2 are located on the surface 3 of the earth 4. Incident and reflected wave paths 5 and 6, respectively, are shown for a reflective boundary 7 below the surface of the earth.

In this case, it is assumed that the reflective surface 7 is horizontal, such that the point of reflection 8 lies directly below the midpoint 9. The time between emission of a seismic pulse from the source 1 and the arrival of its reflection at the receiver 2 is measured directly, and this time can be used to determine the equivalent travel time of a vertically travelling ray 10 from 9 to 8 and back to 9. The correction to normally incident travel time is referred to as normal moveout (NMO) and is correct for horizontal or nearly horizontal reflectors. The diagram illustrates the case for constant velocity of propagation, but this is not a requirement for the technique.

Figure 2:
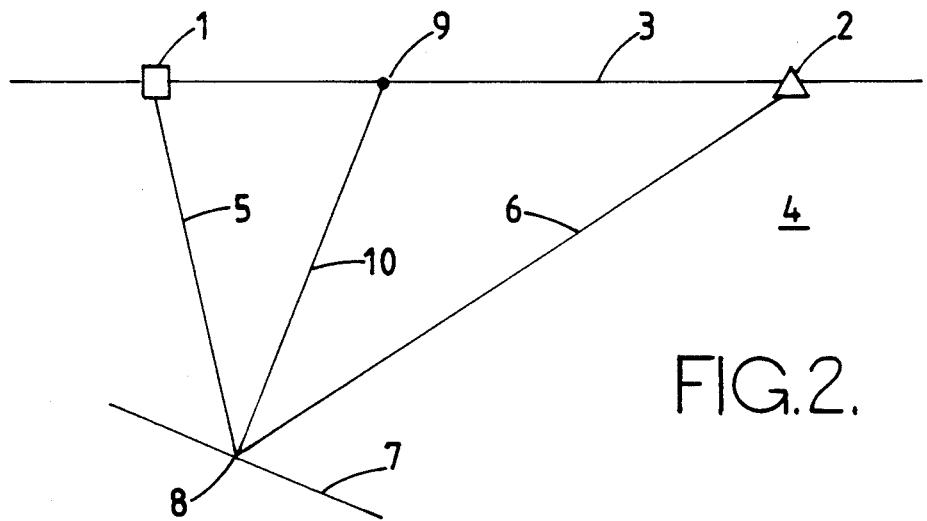
FIG. 2 is a diagram illustrating DMO.

However, for situations in which the inclination of the reflector is significant, this technique alone is inadequate, as illustrated in FIG. 2. An additional correction, dip moveout (DMO), is required.

As shown in FIG. 2, for an inclined reflector 7 using a source 1, a reflection 8 will be recorded by the receiver 2. The length of the corresponding normal travel path 10 will be different from that of FIG. 1. Furthermore, the surface location 9 is different from the midpoint of the source and receiver as a result of the dip. The additional correction needed to allow for the possibility of such dipping reflectors is known as dip moveout (DMO) and is typically applied after NMO.

As is readily apparent from geometrical considerations, for a given travel time of seismic energy from source 1 to the receiver 2, the reflection point 8 could lie on any point of the surface of an ellipsoid with the source 1 and the receiver 2 at its foci. DMO generates, from a parent trace as recorded at the receiver 2, a plurality of offspring traces for the reflection point 8 located at different points on the surface of the ellipsoid, and subsequent stacking operations serve to reinforce the offspring trace which corresponds to the actual inclination of the reflective boundary 7 while cancelling out the other offspring traces.

Figure 3:
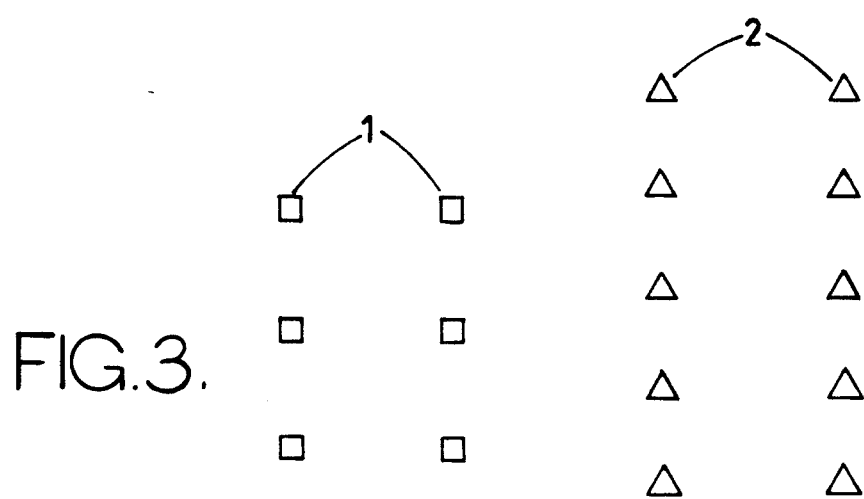
FIG. 3 is a diagrammatic plan view illustrating a possible layout of sources and receivers for three-dimensional seismic exploration.

In a typical three-dimensional seismic survey, sources 1 and receivers 2 are located so as to cover an area of interest, for instance as shown in FIG. 3. The sources 1 are arranged as an array, which may be regular if the surface topography permits. Likewise, the receivers 2 may be arranged as a surface array which may be regular. The receivers 2 may be at different locations for different shots. The sources and receivers are arranged such that seismic energy passes through the earth in a variety of directions to each of the receivers from each source so that enough seismic data can be gathered in order to be able to determine the structure of the earth in the area of exploration. The sources 1 are actuated in turn with a delay between consecutive actuations sufficient for reflected seismic energy at the receivers 2 to have died away or to have fallen below the noise threshold. The receivers 2 record individual traces for each source actuation in turn so that, when all of the sources have been actuated, there is a trace corresponding to each combination of source and receiver. DMO is then performed for each such trace.

Figure 4:
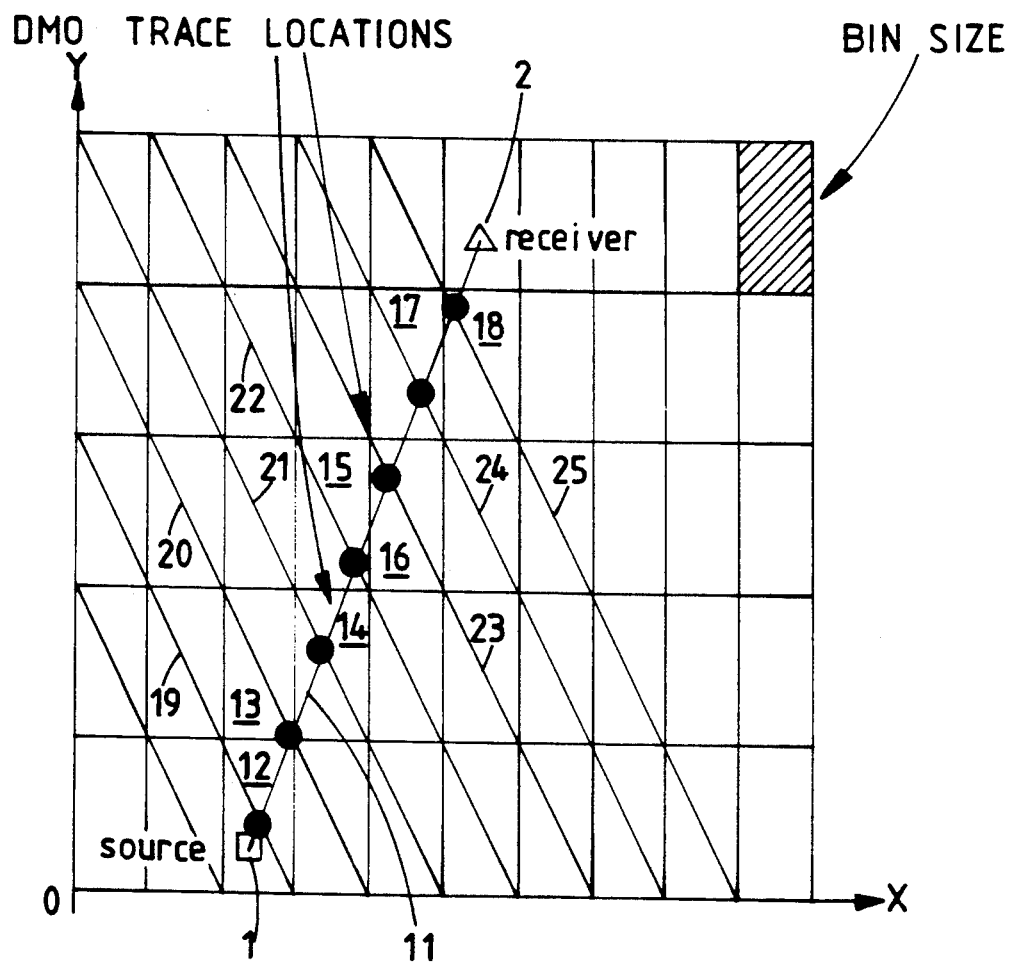
FIG. 4 is a diagrammatic plan view illustrating assignment of offspring traces for a typical source and receiver combination.

As shown in FIG. 4, the area being explored is divided into a regular array of rectangular regions or "bins" referenced to Cartesian co-ordinates X and Y. The locations of a typical source 1 and a typical receiver 2 are shown for one of the recorded traces. A straight line segment 11 extends between the source 1 and the receiver 2 and has a slope which is positive with respect to the co-ordinates X and Y. This line segment passes through the bins 12 to 18. A set of diagonal lines 19 to 25 pass through the bins 12 to 18, these diagonals having a negative slope with respect to the co-ordinates X and Y. Each of the diagonals intersects the line segment 11 in each of the bins 12 to 18 at a point shown as a small black circle. These points are used to define the surface points 9 for the generation of offspring traces by DMO.

It is thus possible to ensure regular spacing of the offspring traces, since the intersection points are regularly spaced along the line segment 11. Further, all of the bins 12 to 18 traversed by the line segment 11, and only these bins, receive exactly one DMO offspring trace.

This generation of offspring DMO traces is repeated for each combination of source and receiver during subsequent processing of the data, and the offspring traces in each bin are stacked or added together. During this stacking, offspring traces which correspond to the actual inclination at the point of reflection are reinforced whereas other "spurious" offspring traces tend to cancel out as they represent incoherent noise. Thus, the stacked traces for all of the bins take into account dipping of the reflective boundaries.

As will be apparent from the geometry illustrated in FIG. 2, offspring traces can only be generated on the line segment 11 between the source 1 and the receiver 2 and cannot be generated beyond the source or the receiver. Also, for reflections from deeper reflected boundaries, offspring traces can be located in only a middle portion of the line segment 11 and not close to the source 1 and the receiver 2. The portion of the line segment within which offspring traces can be located is generally referred to as the "aperture". For deep reflections, the aperture may be too small for it to be intersected by one of the diagonals. In this case, it is sufficient to locate the offspring trace at the midpoint of the aperture. Should this midpoint occur on one of the grid lines defining the bins, then a consistent choice for allocation to a bin should be made. For instance, the allocation might be always to the bin on the right for vertical grid lines and always to the bin above for horizontal grid lines.

In cases where the line segment 11 is parallel to one of the axes X or Y, so that its slope is non-finite and the polarity is indeterminate, diagonals with positive slopes or diagonals with negative slopes may be chosen at will and will result in the same trace spacing.

Generation of DMO offspring traces at the locations defined in this way enables the allocation of a unique trace to each bin traversed by the part of the line segment within the DMO aperture. It is therefore the most economic method of ensuring that a DMO trace contributes to each such bin, within the constraint of regular trace spacing. Regular trace spacing provides for simple calculation of amplitude and operator anti-aliasing criteria. Furthermore, this method will give the optimum summation of DMO offspring traces for each bin location, within the constraint of regular trace spacing.

Various modifications may be made within the scope of the invention. For instance, the method has applications beyond the field of DMO as such. It can be employed whenever a trace from a given source-receiver pair is mapped onto a 3D grid in such a way that all traces generated must have locations which lie either upon the line which passes through the source and receiver, or the projection of such a line onto the processing plane. In particular the method could be extended beyond DMO to include any method of estimating the 3-D zero offset data given as input a number of traces acquired with different sources and receivers on or near the surface. One such type of procedure is "partial inversion" using a damped least squares technique to estimate the best fit zero offset data given a number of non-zero offset traces.

We claim:

1. A method of assigning a seismic trace obtained by means of a seismic energy source at a first location and a receiver at a second location, comprising the steps of:

defining a two dimensional coordinate system representing a plane containing a plane containing the first and second locations;

defining a straight line segment extending between the first and second locations;

defining an array of congruent regions covering at least a portion of the straight line segment;

defining, in each of the regions intersected by the portion of the straight line segment, a crossing line intersecting the straight line segment at an intersection point, the crossing lines defined in all the regions being parallel to each other and the intersection points being evenly spaced apart; and assigning offspring seismic traces to the intersection points.

2. A method as claimed in claim 1, wherein:

each of the congruent regions has a center of area; and the crossing line defining step comprises defining the crossing line in each region passing through the center of area of the region.

3. A method as claimed in claim 2, and further comprising:

defining the two dimensional coordinate system as a rectangular cartesian coordinate system having first and second axes; and defining the regions as rectangles.

4. A method as claimed in claim 3, and for the comprising:

defining the crossing lines as diagonals of the rectangles.

5. A method as claimed in claim 4, and further comprising:

defining each of the crossing lines having a polarity of slope; and defining the straight line segment having a polarity of slope, so that the polarity of slope of the crossing lines with respect to said coordinate system is opposite to the polarity of slope of the straight line segment with respect to the coordinate system.

6. A method as claimed in claim 1, and further comprising:

defining the plane represented by the coordinate system as substantially horizontal.

7. A method as claimed in claim 1, and further comprising:

locating a plurality of receivers at respective second locations.

8. A method as claimed in claim 1, and further comprising:

locating a plurality of receivers at respective second locations.

9. A method as claimed in claim 8, and further comprising:

actuating the sources consecutively.

10. A method as claimed in claim 1, and further comprising:

assigning a plurality of offspring seismic traces to at least one of the regions used; and stacking the offspring traces.

11. A method as claimed in claim 10 and further comprising:

assigning the offspring traces for different combinations of source and receiver to respective intersection points; and stacking the offspring traces at each respective intersection point.

12. A method as claimed in claim 7, and further comprising;

locating a plurality of sources at respective first locations.

13. A method as claimed in claim 12, and further comprising;

actuating the sources consecutively.

* * * * *